United States Patent [19]

Szpunar et al.

[11] Patent Number: 5,205,713

[45] Date of Patent: Apr. 27, 1993

[54] FAN BLADE DAMPER

[75] Inventors: Stephen J. Szpunar, West Chester; Christopher C. Glynn, Hamilton, both of Ohio

[73] Assignee: General Electric Company, Cincinnati, Ohio

[21] Appl. No.: 693,165

[22] Filed: Apr. 29, 1991

[51] Int. Cl.[5] ............................................. F01D 5/26
[52] U.S. Cl. .................................. 416/193 A; 416/500
[58] Field of Search ........... 416/193 A, 219 R, 220 R, 416/221, 500

[56] References Cited

U.S. PATENT DOCUMENTS

| | | | |
|---|---|---|---|
| 2,935,297 | 5/1960 | Stalker | 416/219 R |
| 2,997,274 | 8/1961 | Hanson | 416/219 R |
| 3,181,835 | 5/1965 | Davis | 416/219 R |
| 3,666,376 | 5/1972 | Damlis | 416/219 R |
| 4,182,598 | 1/1980 | Nelson | 416/193 A |
| 4,480,957 | 11/1984 | Patel et al. | 416/219 R |
| 4,494,909 | 1/1985 | Forestier | 416/190 |
| 4,516,910 | 5/1985 | Bouiller et al. | 416/190 |
| 4,723,889 | 2/1988 | Charreron et al. | 416/193 A |
| 4,872,812 | 10/1989 | Hendley et al. | 416/190 |
| 4,936,749 | 6/1990 | Arrao et al. | 416/193 A |

FOREIGN PATENT DOCUMENTS 189602  8/1988  Japan ......................... 416/219 R Primary Examiner—Edward K. Look
Assistant Examiner—James A. Larson
Attorney, Agent, or Firm—Jerome C. Squillaro; Charles L. Moore, Jr.

[57] ABSTRACT

A fan blade damper system includes a fan disk integrally connected to a disk post. A retainer is fastened to the disk post and is molded to retain a damper block. The top portion of the damper block is shaped to make frictional contact with the underside of the platform of a fan blade, the underside of the platform being the region of the fan blade which experiences the highest platform vibratory amplitude when the fan blade is rotated. The damper block is thus mounted in a statically determinant fashion. The rotation of the fan blade produces centrifugal forces which produce reactionary forces in the damper block and retainer such that a maximum damping force amplitude is reacted to the fan disk.

15 Claims, 3 Drawing Sheets

FAN BLADE DAMPER

BACKGROUND OF THE INVENTION

1. Field of the Invention

The present invention relates generally to gas turbine engines and, more particularly, to damping mechanisms for reducing vibratory stress levels in rotating blades of such engines. More particularly, the present invention relates to a damping mechanism which is mounted in a statically determinant fashion to insure a full damping load is transmitted to the blade platform. The damper is located in a region of the blade which experiences the highest platform vibratory amplitude, this vibratory amplitude being produced as a result of the centrifugal forces produced during the rotation of the blade. As a result of the statically determinant fashion by which the damper is mounted, the high vibratory amplitude experienced by the blade platform is reacted by the fan disk to which the damper is connected via a retainer mechanism.

2. Discussion of the Background

Gas turbine engines typically have a plurality of rows of circumferentially spaced rotor blades mounted on a rotor disk for rotation about an engine axis. These blades exist in a myriad of different shapes and configurations, but generally have an innermost root portion, an intermediate platform portion, and an outermost airfoil portion. In one form, the root portion has an inverted "fir tree"-like shape or appearance, also known as a dovetail, and is slidably received in a complimentary configured recess provided in the rotor disk. The platform portions separate the root and airfoil portions of the blades, and collectively define a radially outwardly facing wall of an annular gas flow passageway which confines the gas flow to the airfoil portion of the blades. These airfoil portions are subject to fatigue due to vibrations and stress from the gas flow in the passageway. This problem is particularly acute since the disk may be rotated at angular speeds ranging from zero to several thousand revolutions per minute.

The source and nature of blade vibrations in gas turbine engines are difficult to understand, identify, and eliminate. Such vibrations may, in fact, be a function of many variables. One type of blade used in aircraft gas turbine engines has been noted to exhibit relatively high vibratory stress levels when exposed to unsteady, supersonic aerodynamic flow at high rotational speeds. These high vibratory stress levels occur primarily during the climb operation of an aircraft. High stress levels, when combined with a blade leading edge nick or dent may result in blade failure due to high cycle fatigue (HCF), i.e., HCF is primarily caused by high vibratory stress levels.

Numerous designs have been instituted to dampen blade vibration. One type of damping device for turbojet engine blades includes a wedge placed between the platforms of the blades, the shanks of the blades, and the disk. The wedge consists of a hollow, bellows-shaped body fitted with an axial stop member. The body is inflated after mounting so that it takes up all the space between the platforms of the blades, the blade shanks, and the teeth of the disk. This wedge constitutes an inflatable anti-clank device that is used to reduce blade clank during windmilling operation, when centrifugal blade loads are insufficient to load the blade, but is not intended to dampen high energy vibrational modes.

Another type of damping device uses cylindrical blocks or wedges located between adjacent blades and connected to a rotor disk with the primary object of preventing large angular rotations of fan blades when, for example, a bird is accidentally ingested in flight. Damper block loading is shared between adjacent blade platforms in this type of device so that damper loading between blades is not statically determinate, and is therefore dependent on blade platform geometry which varies from blade to blade. Further, this type wedge merely provides damping by transmitting shock loads and distributing resultant forces over an adjacent sector of the rotor.

In still another form of damping device, a retractable damping device is positioned between adjacent blades so as to make contact with a lower face of a platform of each adjacent blade. Such a damper only relies on damping between adjacent fan blades (not the relative motion between the blade and the fan disk) and is not believed to be effective in reducing vibratory stress induced by unsteady, supersonic aerodynamic flow at high rotor speeds. Furthermore, some types of blades are unable to utilize dampers which rely on relative motions between adjacent blades to provide friction forces to dissipate blade vibratory energy since certain platform geometries prevent balanced centrifugal load sharing between the blades.

Thus, a need exists for an effective damping mechanism for rotating blades which significantly reduces vibratory stress levels.

SUMMARY OF THE INVENTION

Accordingly, one object of the present invention is to provide a novel damping mechanism which ensures a full damping load is transmitted to a blade platform by mounting the damper in a statically determinant fashion.

Another object of the present invention is to realize a maximum damping force amplitude by reacting the centrifugal forces of a rotating blade with the blade disk. This is believed to be the only effective way to dampen vibrations caused by supersonic, unsteady flow where the relative displacement between adjacent blade platforms is small.

Still another object of the present invention is to prevent fan blade failure caused by high cycle fatigue.

Yet another object of the present invention is to provide a damping mechanism which achieves the above objects and which can be accommodated into existing turbine engines.

These and other objects of the present invention are achieved by a rotating blade damper system having a damper means for frictionally engaging a region of a blade having a highest platform to disk vibratory amplitude. The damper means is retained by a retaining means which imposes a tangential and axial force on the damper means when the fan blade is rotated.

BRIEF DESCRIPTION OF THE DRAWINGS

A more complete appreciation of the invention and many of the attended advantages thereof will be readily obtained as the same becomes better understood by reference to the following detailed description when considered in connection with the accompanying drawings wherein.

DETAILED DESCRIPTION OF THE INVENTION

Figure 1:
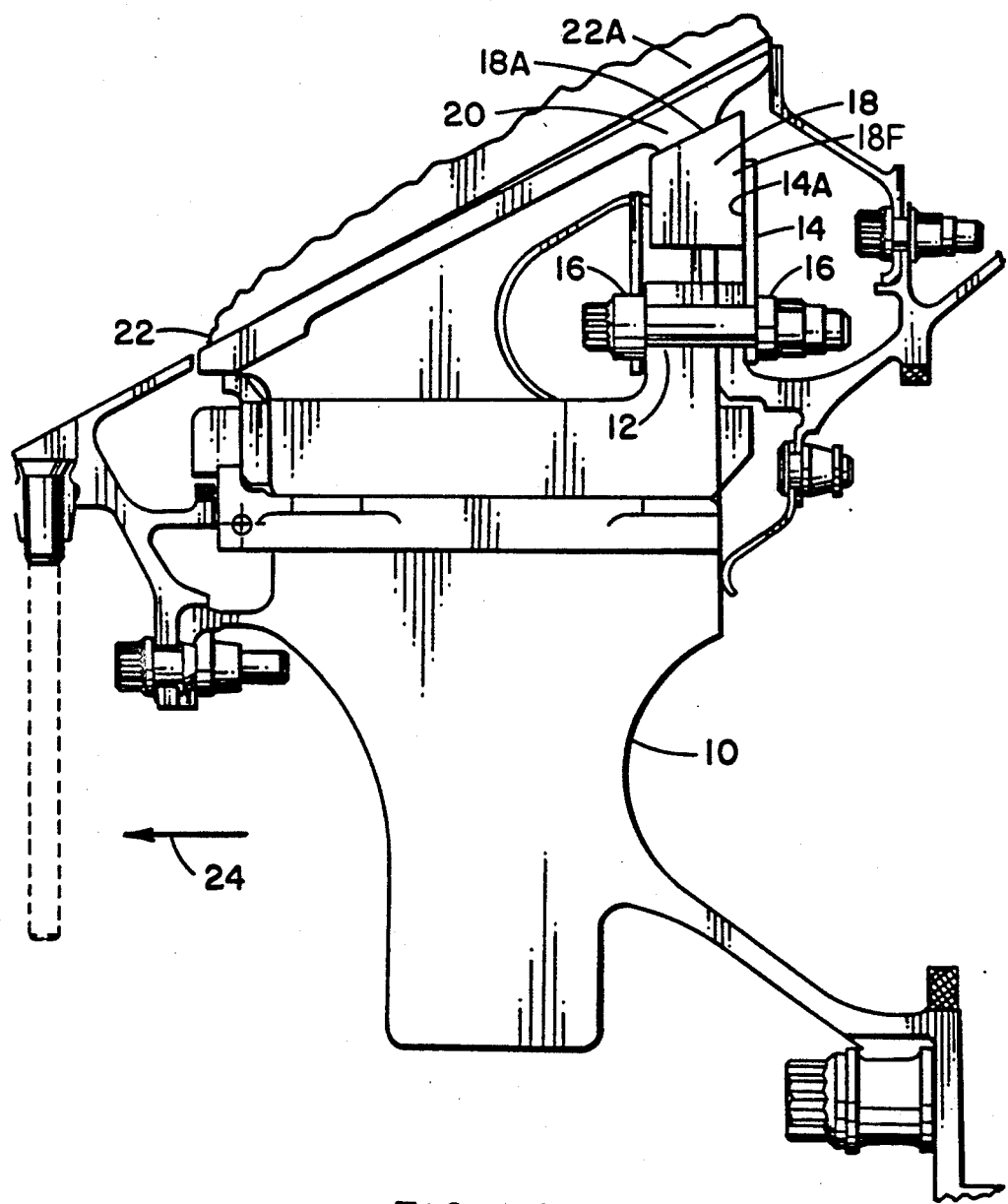
FIG. 1 is a section side-view schematic illustration of the damper mechanism of the present invention.
Figure 2:
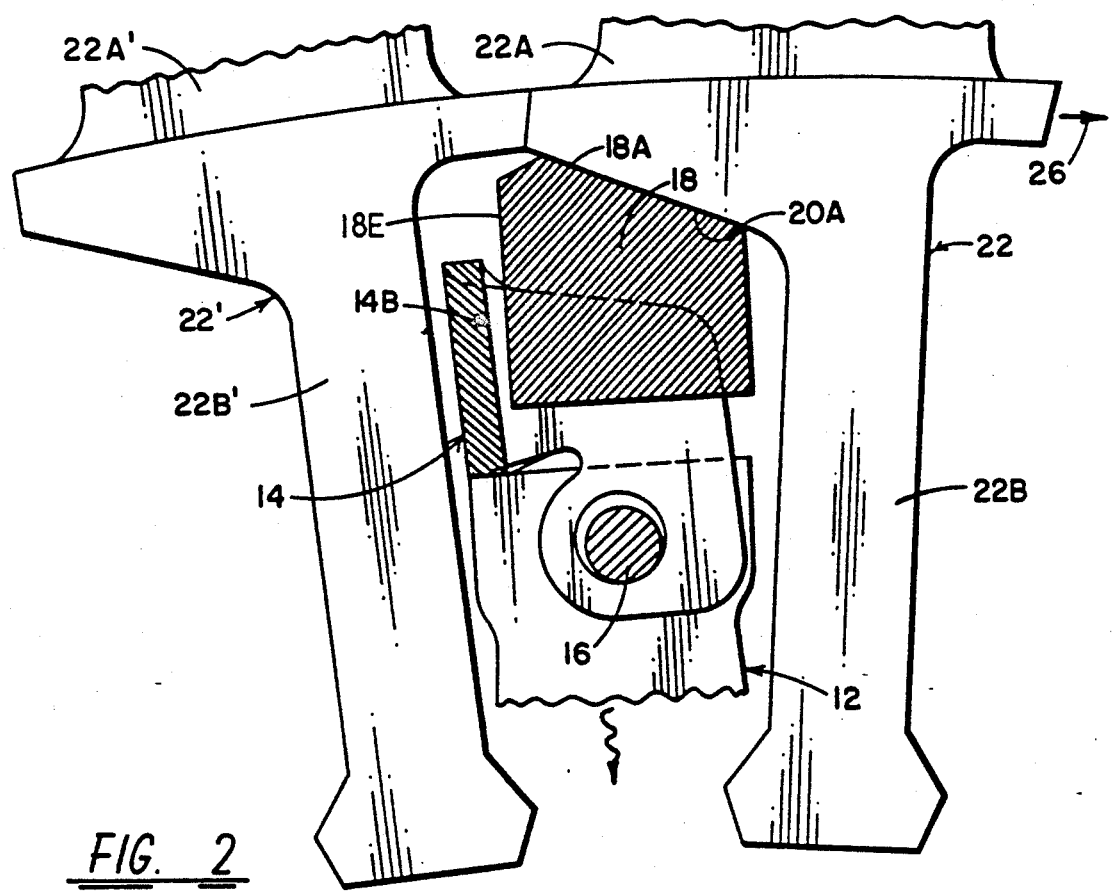
FIG. 2 is an aft side-view schematic illustration of the present invention.

Referring to the FIGS. generally and with particular reference to FIGS. 1 and 2, an annular fan disk 10 includes a plurality of integrally connected fan disk posts 12 each having a retainer 14 secured to a respective radially extending disk post by fasteners 16. While this description is particularly directed to fan blades by way of example, the invention will be appreciated to be applicable to other rotating blades. Fasteners 16 are comprised of a nut and bolt assembly, the bolt being inserted through apertures in each disk post 12 and retainer 14. Each retainer 14 accommodates a corresponding damper block 18 which fits inside the interior walls of the respective retainer 14. A top side 18A of each damper block 18 is sloped to frictionally engage an underside of a blade platform 20 of a blade 22 having a root portion 22B which fits within a slot formed between adjacent disk posts and functions to retain the blade to the fan disk. The airfoil section 22A of blade 22 has been truncated in FIG. 1 for purposes of illustrative clarity. A lateral side of damper block 18 is pressed against a tangential retainer face 14A of retainer 14. Arrow 24 indicates the forward axial direction of the turbine engine of which the present invention is a part.

FIG. 2 is a view from the axially aft edge of blade 22 and illustrates its relationship with an adjacent trailing blade 22'. Arrow 26 indicates the direction of rotation of blades 22 and 22'. Each retainer 14 has an axial retainer face 14B which presses against a second lateral side 18E of a respective damper block 18. The top side 18A of each damper block 18 is engaged with the underside 20A of platform area 20 of a respective blade 22 as in FIG. 1.

Figure 3:
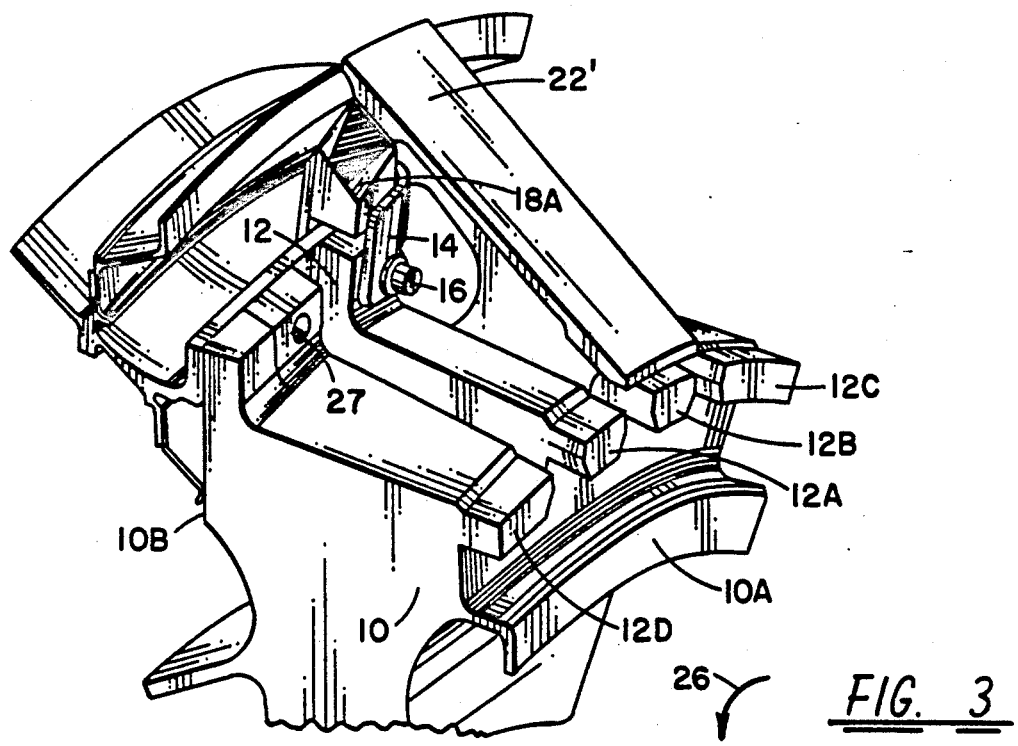
FIG. 3 is an isometric illustration from the front of the retainer of the present invention.

FIG. 3 illustrates a plurality of disk posts (12A, 12B, 12C, etc.) extending radially outward from fan disk 10. The leading edge of disk 10 is indicated at 10A while its trailing edge is indicated at 10B. The slots between adjacent disk posts for receiving the dovetail or root portions 22B of the fan blades 22 can be seen. Blade 22 from FIG. 2 has been removed in FIG. 3 so that the top side 18A of damper block 18 is exposed. Trailing blade 22' is adjacent to damper block 18 but does not make contact with damper block 18. Only the platform portion of blade 22' is shown to simplify the view. The damper block 18 contacts only the one blade platform in order to react the centrifugal forces to the fan disk rather than to adjacent blades to thereby produce a larger damping force amplitude. Retainer 14 is U-shaped and surrounds the lower half of damper block 18 on three sides, the lower half of damper block 18 having a generally rectangular box-like shape. An aperture 27 can be seen in disk post 12D for attachment of a retainer and damper block to that post.

Figure 4:
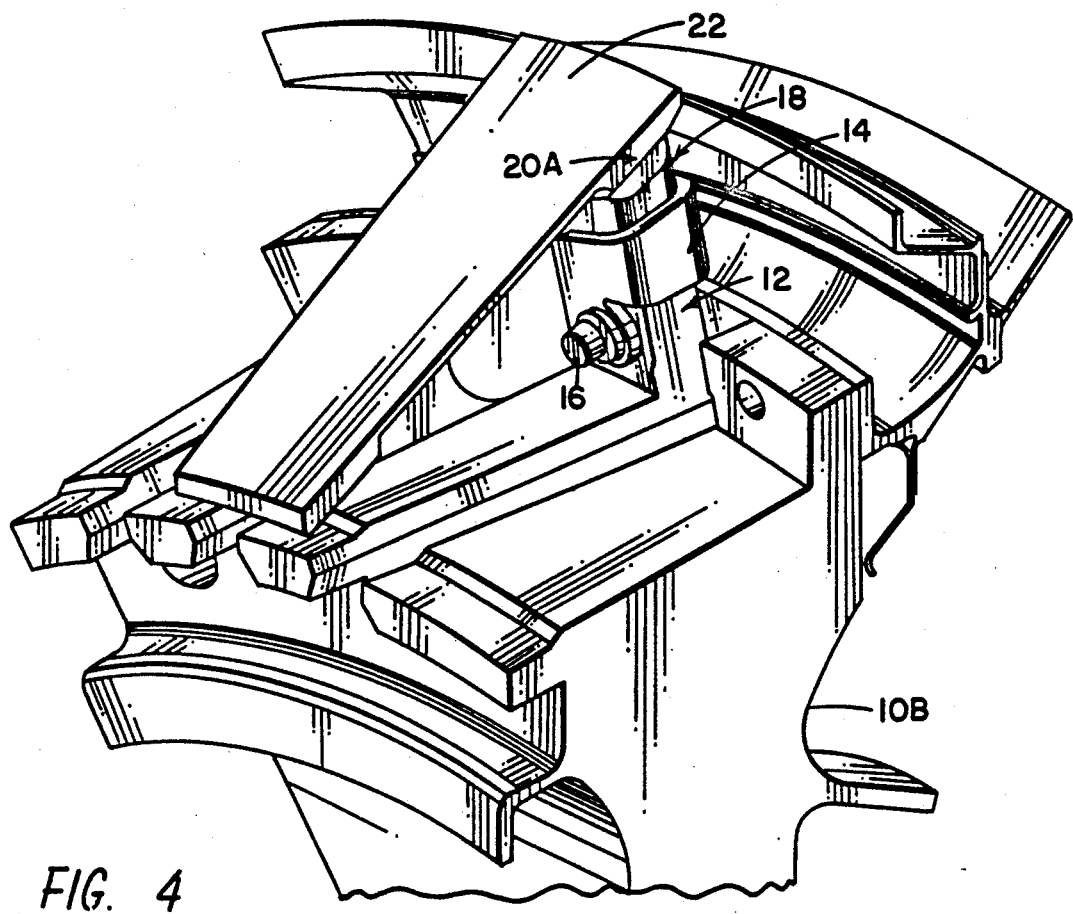
FIG. 4 is an isometric illustration from the rear of the retainer of the present invention.

FIG. 4 is a reverse angle view of FIG. 3 illustrating the platform area 20A of blade 22 positioned atop damper block 18 with the trailing edge portion of the damper block being visible.

Figure 5:
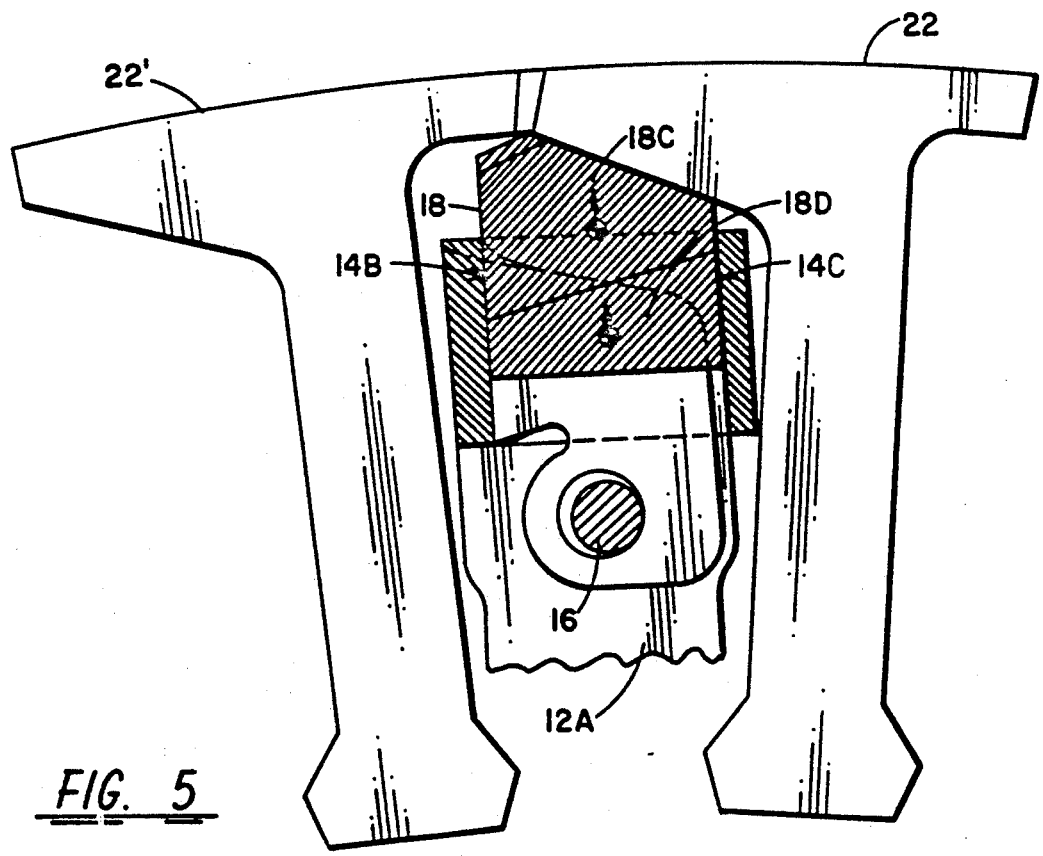
FIG. 5 is an aft side-view schematic illustration of an alternative embodiment of the present invention in which the damper block is comprised of a plurality of pieces.

FIG. 5 is similar to FIG. 2 but with damper block 18 being formed of a plurality of pieces, such as, for example, 18C and 18D and retainer 14 having another axial retainer face 14C. By forming the block of multiple pieces, additional damping forces can be generated by frictional contact between the relatively movable pieces.

In operation, rotation of the fan disk 10 and associated blades 22 creates a centrifugal force which drives the damper block 18 against the underside of the trailing edge of fan blade platform 20. Since the damper block is positioned at the trailing edge of the underside of platform 20, damper 18 is located in the region of the blade which experiences the highest platform vibratory amplitude. The top 18A of damper block 18 is sloped to conform to the shape of the underside of blade platform 20. As a result of the rotational forces and the sloping geometry of the top 18A of damper block 18, damper block 18 would move tangentially to fan disk 10 were it not for a tangential reactionary force applied to the damper block.

The tangential reactionary force on block 18 is supplied by retainer face 14B of retainer 14 against block face 18E (see FIG. 2). In addition, due to the axial slope on the underside of platform 20, a similar axial reaction is generated by the retainer face 14A of retainer 14 against block face 18F as shown in FIG. 1. Thus, the damper block 18 is mounted in a statically determinant fashion which ensures that a consistent and full damping load is transmitted to the retainer faces 14A and 14B.

As the blade 22 vibrates in a mode which creates a relatively high vibratory stress, a periodic radial motion of the blade platform is induced. This vibratory motion causes the damper block 18 to move relative to retainer 14. Tangential and axial reactions give rise to frictional forces which react against the damper block as it presses against the retainer 14. These frictional forces dissipate the aerodynamic energy driving the fan blade 22 which reduces the vibratory stress of the blade. The damper block 18 in having a rectangular cross-section provides more surface area which serves as an anti-rotationary feature while reducing the wear of the retainer and damper block.

The damper block 18 can be made of metal, plastic, metal-plastic combination, or other suitable material which will optimize damper weight and center of gravity location. If desired, visco-elastic material could be added to the damper surfaces to provide additional damping. The retainer could be formed of sheet metal or manufactured by any number of methods.

The invention is easily installed into existing engines. By installing a damper block and retainer to each disk post of a fan disk, damping can be provided for every blade of the engine. Flight testing of the invention has demonstrated up to a 50% reduction in vibratory stress amplitude.

As an alternative to the location described above, a damper block element might be mounted in a statically determinant fashion so as to be reacted by the underside of the platform of a leading blade and the shank of a trailing blade. Still further, the angle of the faces 18A and 18E of the damper block could be varied to control the degree of damping.

The foregoing description has been intended to be illustrative and non-limiting. Numerous changes and modifications of the present invention are possible in light of the above teachings. It is therefore to be understood that the invention may be practiced otherwise than as specifically described herein and still be within the scope of the appended claims.

What is claimed is:

1. A fan blade damper system comprising:
   damper means for frictionally engaging a highest vibratory region of a fan blade; and
   retainer means for retaining said damper means so that said damper means is mounted in a statically determinant fashion, said retainer means having at least three sides with two opposite sides for mounting to a fan disk post with said damper means being disposed directly radially above the fan disk post.

2. A system according to claim 1 wherein:
   said retainer means includes means for providing a tangential force to said damper means when the fan blade is rotated.

3. A system according to claim 2 wherein:
   said retainer means further includes means for providing an axial force to said damper means when the fan blade is rotated.

4. A system according to claim 3 wherein:
   said damper means comprises a damper block.

5. A system according to claim 4 wherein said retainer means comprises a retainer having an axial face and a tangential face.

6. A system according to claim 1 wherein:
   said highest vibratory region of said fan blade is an underside area of a platform of said fan blade adjacent an axial trailing edge thereof.

7. A system according to claim 1 further comprising:
   a fan disk having a plurality of circumferentially spaced disk posts, one of said retainer means being fastened to each of the disk posts, and said fan blade being mounted for rotation with said fan disk; and
   said retainer means and said damping means together comprising means for producing a maximum damping force amplitude by reacting the centrifugal forces caused by the rotation of the fan disk and fan blade.

8. A fan blade damper system comprising:
   a damper block for frictionally engaging a highest vibratory region of a fan blade; and
   a retainer for retaining said damper block so that said damper block is mounted in a statically determinant fashion, said retainer having at least three sides with said damper block being disposed above a fan disk post and said retainer having an axial face to provide a tangential force to said damper block and a tangential face to provide an axial force to said damper block when the fan blade is rotating.

9. A system according to claim 8 wherein:
   said damper block has a substantially rectangular cross-sectional area.

10. A system according to claim 9 wherein:
    said damper block has a top portion which is sloped to conform to an underside area of a platform of said fan blade.

11. A fan blade damper system comprising:
    a fan disk having a plurality of circumferentially spaced disk posts, a slot being defined between each adjacent pair of disk posts;
    a plurality of retainers each having at least three sides with two opposite sides attached to a respective disk post, each of said retainers having an axial and a tangential face;
    a plurality of fan blades each having an airfoil portion, a root portion, and a platform portion interposed between said airfoil portion and said root portion, said root portion being adapted for being retainably engaged in said slot for supporting said blade in an operable position on said fan disk;
    a plurality of damper blocks each being captured by a respective one of said retainers between an underside of a respective one of said platform portions and a radially outer surface of a corresponding disk post, each of said damper blocks being positioned for contacting each of said platforms at a location corresponding to a region of maximum platform vibratory amplitude; and
    said axial face of each retainer providing a tangential force to said respective damper block when the fan disk is rotated.

12. A fan blade damper system according to claim 11 further comprising:
    fastening means for fastening each of said retainers to the disk post.

13. A fan blade damper system according to claim 11 wherein:
    each of said damper blocks is connected to said respective retainer and to the region of highest platform vibratory amplitude of said fan blade in a statically determinant manner.

14. A fan blade damper system according to claim 11 wherein:
    said tangential face of each retainer provides an axial force to said damper block when the fan disk is rotated.

15. A fan blade damper system according to claim 11 wherein:
    each of said damper blocks comprises a plurality of frictionally engaging pieces for providing additional damping force from relative movement of the pieces.

* * * * *